(12) United States Patent
Yajima et al.

(10) Patent No.: US 7,105,970 B2
(45) Date of Patent: Sep. 12, 2006

(54) CORED MOTOR

(75) Inventors: Teryuki Yajima, Fujieda (JP); Mitsuo Kodama, Fujieda (JP)

(73) Assignee: Victor Company of Japan, Limited, Yokohama (JP)

( * ) Notice: Subject to any disclaimer, the term of this patent is extended or adjusted under 35 U.S.C. 154(b) by 0 days.

(21) Appl. No.: 11/062,484

(22) Filed: Feb. 23, 2005

(65) Prior Publication Data

US 2005/0264121 A1 Dec. 1, 2005

(30) Foreign Application Priority Data

May 27, 2004 (JP) ............... 2004-157304

(51) Int. Cl.
*H02K 21/12* (2006.01)
(52) U.S. Cl. ............... 310/156.45; 310/67 R; 310/89; 310/90
(58) Field of Classification Search ............. 310/67 R, 310/89, 90, 90.5, 156.43–156.45, 216, 254, 310/261
See application file for complete search history.

(56) References Cited

U.S. PATENT DOCUMENTS 5,142,176 A * 8/1992 Takahashi ............ 310/90.5

6,580,190 B1 * 6/2003 Takasu ............ 310/154.28
2003/0020341 A1 * 1/2003 Nagatsuka ............ 310/67 R

FOREIGN PATENT DOCUMENTS

JP    10-4642/1998    1/1998

* cited by examiner

*Primary Examiner*—Thanh Lam
(74) *Attorney, Agent, or Firm*—Connolly Bove Lodge & Hutz LLP

(57) ABSTRACT

A cored motor includes a rotor (21), having a rotor hub (2), a shaft (1) fixed to the rotor hub (2), a rotor yoke (5) in ring shape and a ring magnet (6) fixed to an inner circumferential surface of the rotor yoke (5). A stator (3) has a motor base (13) and a stator core (14) and a sleeve (9) in cylindrical shape fixed to the motor base (13) respectively. A surface of the rotor hub (2) in the motor base side is provided with a recessed portion (23) having an annular shape and a raised portion (24) that protrudes continuously or intermittently in an annular shape. The rotor yoke (5) is fixed to the recessed portion (23) and the ring magnet (6) contacts the raised portion (24) and fixed to the rotor yoke (5). Respective center lines of the rotor yoke (5), the ring magnet (6) and the stator core (14) are aligned in a longitudinal direction along the shaft (1) and are made approximately coincidental with each other.

2 Claims, 3 Drawing Sheets

| | Revolutions per minute | | | | | |
|---|---|---|---|---|---|---|
| | 7920 rpm | | 7200 rpm | | 7920 rpm | |
| Samples | COM. | EMB. | COM. | EMB. | COM. | EMB. |
| Maximum value [V] | 10.76 | 7.93 | 15.21 | 10.32 | 16.93 | 11.60 |
| Minimum value [V] | 4.90 | 5.19 | 2.89 | 4.31 | 5.02 | 5.84 |
| Mean value [V] | 6.957 | 6.237 | 7.989 | 7.268 | 9.599 | 8.168 |
| Standard deviation | 1.5276 | 0.7485 | 2.9285 | 1.7561 | 3.0934 | 1.5966 |

Note: "COM." and "EMB." in the Samples line represent "comparative example" and "embodiment" respectively.

CORED MOTOR

BACKGROUND OF THE INVENTION

1. Field of the Invention

The present invention relates to a cored motor, particularly, relates to a cored motor having a dynamic pressure bearing, which is suitable for driving a disc installed in a hard disc drive (HDD).

2. Description of the Related Art

A typical example of a conventional cored motor is disclosed in the Japanese publication of unexamined patent applications No. 10-4642/1998. The cored motor disclosed in the publication is composed of a shaft, a stator case, a rotor core that is installed with laminated cores, and a magnet that is mounted on the inner surface of the stator case so as to confront with the outer circumferential surface of the rotor core.

Further, there existed another example of a cored motor for HDD according to the prior art shown in FIGS. 4 and 5.

With referring to FIGS. 4 and 5, the cored motor for HDD according to the prior art is explained.

FIG. 4 is a cross-sectional view of a cored motor according to the prior art.

FIG. 5 is a fragmentary cross-sectional view, with enlarging a part of the cored motor indicated by a circle "B" in FIG. 4.

In FIGS. 4 and 5, a cored motor is composed of a stator 103 and a rotor 121 that is provided with a rotor hub 102, which is installed with a disc 26.

The stator 103 is further composed of a motor base 113, a stator core 114 that is fixed to the motor base 113, and a sleeve 109.

The sleeve 109 sustains a shaft 101 through a dynamic pressure bearing so as to rotate freely as well as being fixed to a center hole 113a of the motor base 113, wherein description of the dynamic pressure bearing is omitted.

On the other hand, the rotor 121 is further composed of the rotor hub 102, an annular rotor yoke 105, and a ring magnet 106. The rotor 121, annular rotor yoke 105 and ring magnet 106 are assembled such that the annular rotor yoke 105 is fixed to an outer circumferential area of the rotor hub 102 on the bottom and the ring magnet 106 that is electropainted is affixed on the inner circular side surface of the annular rotor yoke 105. In this assembling process, as shown in FIG. 5, positioning of the ring magnet 106 in an axial direction along the shaft 101 is limited by a stopper section 117, wherein the stopper section 117 is provided on an inner circumferential area of the annular rotor yoke 105.

Further, the shaft 101 is press-fitted into the rotor hub 102 and the rotor 121 enables to rotate freely with respect to the stator 103.

A section of the annular rotor yoke 105 is formed in an inverted "L" shape having a crooked section 112 in the rotor hub 102 side, wherein the crooked section 112 extends toward a center of the annular rotor yoke 105. The crooked section 112 is formed by the drawing process.

Further, the crooked section 112 effectively protects a recording and reproducing head 150 of an HDD from being affected by magnetic flux possibly leaking from the ring magnet 106.

Furthermore, a clearance section 108 is provided between the ring magnet 106 and the annular rotor yoke 105 so as to reduce magnetic short-circuiting by reducing a contact area between them. The clearance section 108 is also provided for relieving a caulking jig when a caulking process is applied to the rotor hub 102.

With referring to FIG. 5, a positional relationship in the axial direction among the rotor yoke 105, the ring magnet 106, and the stator core 114 is detailed next.

In FIG. 5, the ring magnet 106 and the stator core 114 is allocated such that a center line 118 of the ring magnet 106 having a length L102 in the longitudinal direction along the shaft 101 is shifted upward by a distance DL with respect to another center line 119 of the stator core 114 having a thickness L103 in the longitudinal direction along the shaft 101. Shifting the center line 118 of the ring magnet 106 upward is caused by canceling shift of a magnetic center of the rotor 121 side. If the center lines 118 and 119 coincide with each other, by the crooked section 112 of the rotor yoke 105, a magnetic center of the rotor 121 side is shifted downward with respect to a magnetic center in the longitudinal direction along the shaft 101 of the stator core 114.

In the meanwhile, as mentioned above, the conventional cored motor was provided with the crooked section 112 on the rotor yoke 105 in order to prevent the recording and reproducing head 150 from being affected by magnetic flux possibly leaking from the ring magnet 106.

Further, magnetic flux density of the ring magnet 106 was diminished by the stopper section 117, which short-circuited a part of the magnetic circuit in the rotor hub 102 side. Therefore, as mentioned above, the clearance section 108 was provided so as to relieve a certain level of diminishing magnetic flux density.

However, it was necessary for a forming process of the rotor yoke 105 to provide an extra process for forming the crooked section 112 and the clearance section 108, and resulting in increasing cost of component parts.

Further, since the crooked section 112 was formed by the drawing process, there existed another problem in the manufacturing process such that forming the crooked section 112, the stopper section 117, and the clearance section 108 in higher dimensional accuracy was extremely difficult.

In the mass production of the conventional cored motor, dimensional accuracy of positioning the ring magnet 106 and the rotor yoke 105 fluctuated extremely. In this connection, magnetic flux density was deviated to the upper side of the ring magnet 106, toward the rotor yoke 105, or to the lower side of the ring magnet 106, toward the motor base 113. Consequently, it was difficult to coincide the magnetic center of the ring magnet 106 with the magnetic center of the stator core 114 accurately and without any deviation.

In this case, there existed a further problem such that the rotor hub 102 has rotated with being sucked in either axial direction of upward or downward, and resulting in making vibration and noise larger due to unbalanced rotation of the rotor hub 102.

Further, in the case that a posture of an apparatus installing the conventional cored motor is indefinite, balanced revolution of a rotor hub of a cored motor is intentionally unbalanced by making the rotor hub to be sucked in the axial direction so as to reduce vibration and so as not to degrade revolving efficiency in spite of the posture of the apparatus. Such a cored motor was disclosed in the Japanese publication of unexamined patent applications No. 10-4642/1998.

However, particularly, in the case that such a cored motor is installed in a HDD, actually, posture of the HDD is almost fixed. Consequently, it is most important for the conventional cored motor to balance the revolution of the rotor hub of the cored motor by coinciding the magnetic center of the ring magnet with the magnetic center of the stator core.

Further, in the case that a bearing of the cored motor is a dynamic pressure bearing, there exists a furthermore problem in connection with reliability such that unbalanced force in the axial direction, which occurs when the balanced revolution of the rotor hub collapses, results in shortening life of the dynamic pressure bearing extremely.

SUMMARY OF THE INVENTION

Accordingly, in consideration of the above-mentioned problems of the prior art, an object of the present invention is to provide a cored motor, which is low in vibration and noise, long in life of a dynamic pressure bearing, easy to manufacturing, and low in cost.

In order to achieve the above object, the present invention provides, according to an aspect thereof, a cored motor comprising a rotor being composed of a rotor hub, a shaft fixed to the rotor hub, a rotor yoke in ring shape and a ring magnet fixed to an inner circumferential surface of the rotor yoke; and a stator being composed of a motor base, and a stator core and a sleeve in cylindrical shape fixed to the motor base respectively, wherein the shaft is inserted into the sleeve so as to support the rotor to be rotatable freely with respect to the stator while the ring magnet is kept confronting with the stator core, and wherein a surface of the rotor hub in the motor base side is provided with a recessed portion in annular shape and a raised portion protruded continuously or intermittently in annular shape, and wherein the rotor yoke is fixed to the recessed portion, and wherein the ring magnet is contacted with the raised portion and fixed to the rotor yoke, and the cored motor is characterized in that respective center lines of the rotor yoke, the ring magnet and the stator core in a longitudinal direction along the shaft are made to approximately coincide with each other.

According to another aspect of the present invention, there provides a cored motor, which comprises a rotor being composed of a rotor hub, a sleeve in cylindrical shape fixed to the rotor hub, a rotor yoke in ring shape and a ring magnet fixed to an inner circumferential surface of the rotor yoke; and a stator being composed of a motor base, and a shaft and a stator core fixed to the motor base respectively, wherein the shaft is inserted into the sleeve so as to support the rotor to be rotatable freely with respect to the stator while the ring magnet is kept confronting with the stator core, and wherein a surface in the motor base side of the rotor hub is provided with a recessed portion in annular shape and a raised portion protrudes continuously or intermittently in annular shape, and wherein the rotor yoke is fixed to the recessed portion, and wherein the ring magnet is contacted with the raised portion and fixed to the rotor yoke, and the cored motor is characterized in that respective center lines of the rotor yoke, the ring magnet and the stator core in a longitudinal direction along the shaft are made to approximately coincide with each other.

Other object and further features of the present invention will be apparent from the following detailed description when read in conjunction with the accompanying drawings.

DETAILED DESCRIPTION OF THE PREFERRED EMBODIMENTS

[Embodiment]

Figure 1:
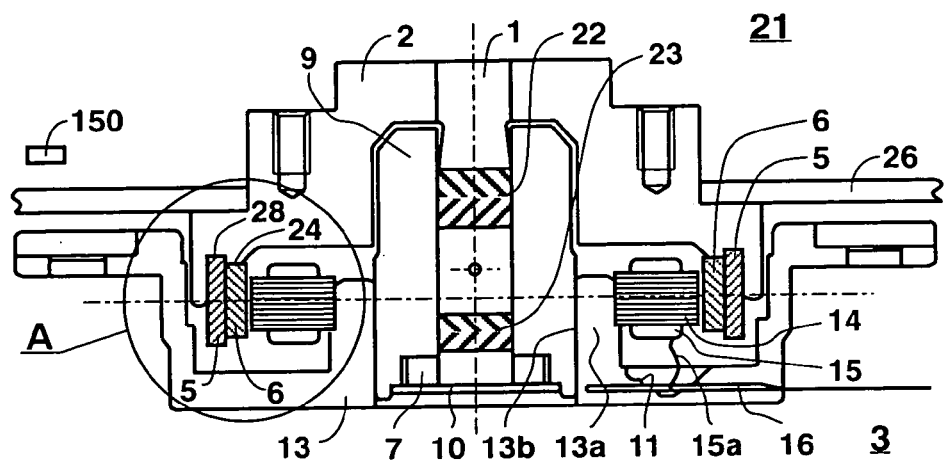
FIG. 1 is a cross sectional view of a cored motor according to an embodiment of the present invention.

FIG. 1 is a cross sectional view of a cored motor according to an embodiment of the present invention.

Figure 2:
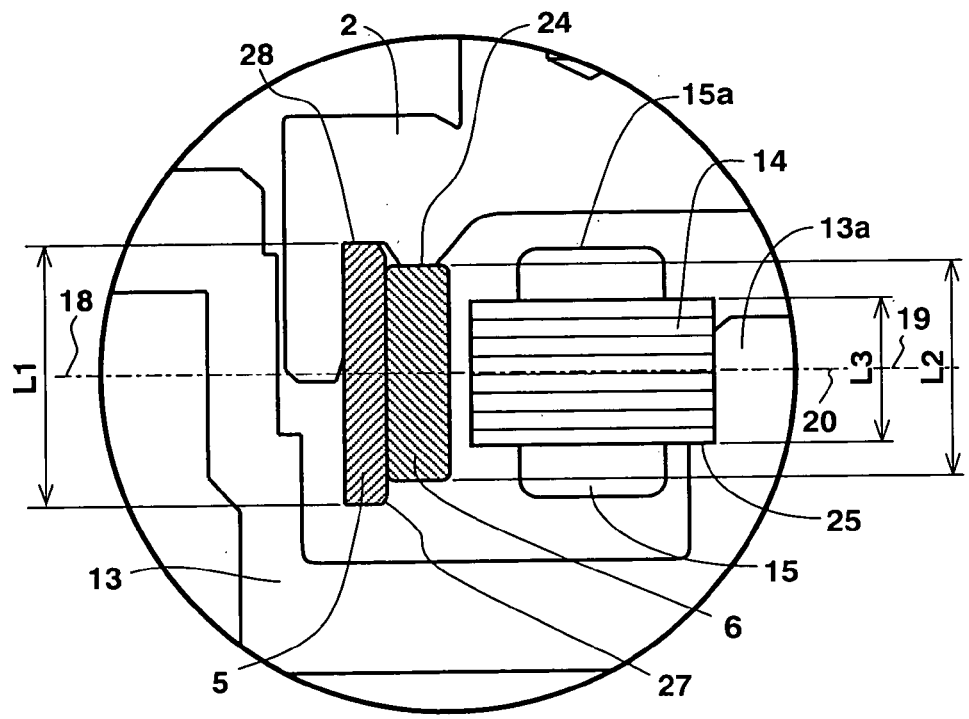
FIG. 2 is a fragmentary cross-sectional view, with enlarging a part of the cored motor indicated by a circle "A" in FIG. 1.

FIG. 2 is a fragmentary cross-sectional view, with enlarging a part of the cored motor indicated by a circle "A" in FIG. 1.

Figures 3A, 3B:
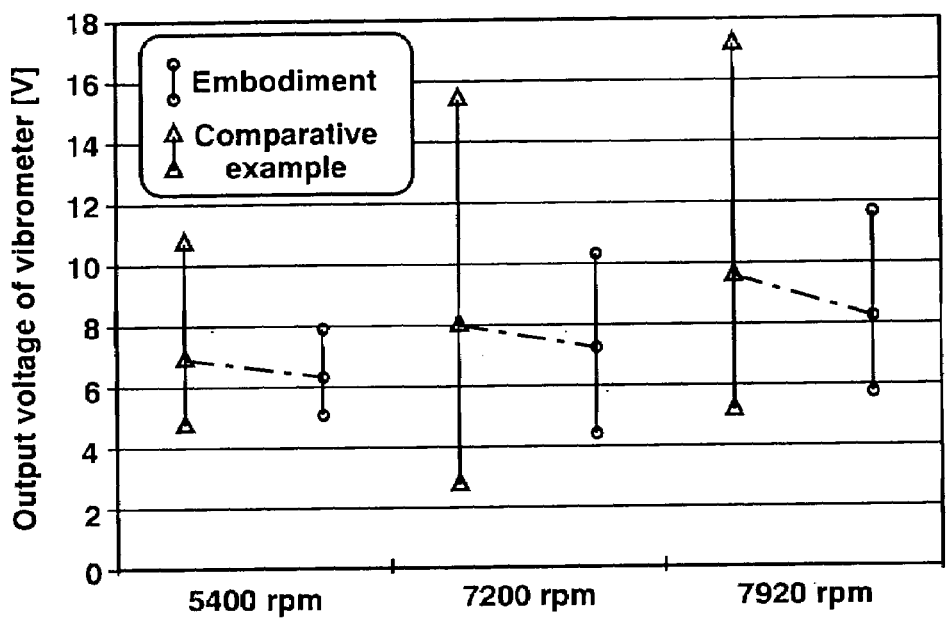
FIG. 3(a) is a graph exhibiting effect of the cored motor according to the embodiment shown in FIG. 1 in comparison with a conventional cored motor according to the prior art as a comparative example.
FIG. 3(b) is a comparison chart between the embodiment and the comparative example based on the graph shown in FIG. 3(a).
Figure 4:
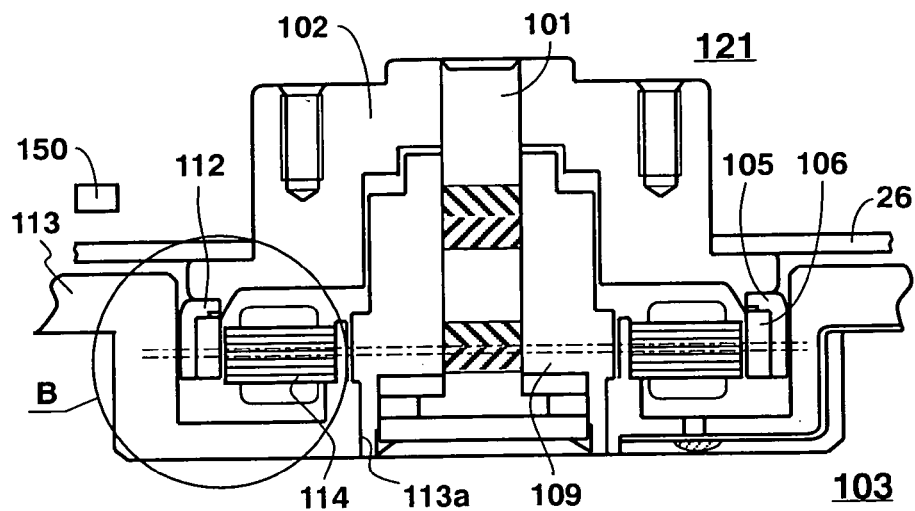
FIG. 4 is a cross-sectional view of a conventional cored motor according to the prior art.
Figure 5:
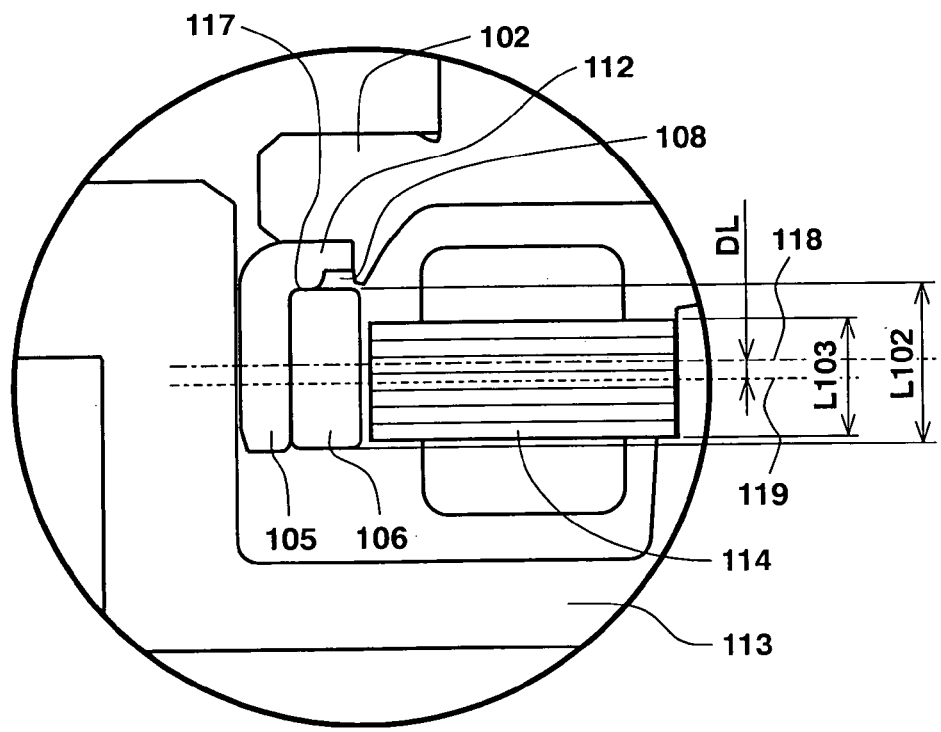
FIG. 5 is a fragmentary cross-sectional view, with enlarging a part of the conventional cored motor indicated by a circle "B" in FIG. 4.

FIG. 3(a) is a graph exhibiting effect of the cored motor according to the embodiment shown in FIG. 1 in comparison with a conventional cored motor according to the prior art as a comparative example.

FIG. 3(b) is a comparison chart between the embodiment and the comparative example based on the graph shown in FIG. 3(a).

In FIGS. 1 and 2, a cored motor (hereinafter referred to as motor) is composed of a rotor 21 having a rotor hub 2 and a stator 3, wherein a disc 26 for magnetic recording and reproducing is mounted on the rotor hub 2 in a later process.

The stator 3 is further composed of a motor base 13, a sleeve 9 that is provided on the motor base 13 with standing upright, and a stator core 14 that is provided with a coil 15.

The rotor 21 is composed of the rotor hub 2 and a shaft 1 that is fixed to the rotor hub 2.

In the stator 3, a cylindrical section 13a is formed on the motor base 13 for mounting the stator core 14, and a stepped section 25 is provided in the cylindrical section 13a.

The stator core 14 is fixed to the stepped section 25 so as to be extremely excellent in dimensional accuracy.

Further, the stator core 14 is formed by laminating eight sheets of silicon steel plate having a thickness of 0.35 mm and a total thickness L3 of the stator core 14 is 2.8 mm.

Furthermore, the coil 15 is wound around the stator core 14.

The sleeve 9 is fixed to a center hole 13b of the cylindrical section 13a. The sleeve 9 sustains the shaft 1 as a bearing, so that the rotor 21 enables to rotate around the stator 3 freely.

The shaft 1 is made from a material of martensite based, ferrite based, or austenite based stainless steel.

Further, the shaft 1 is applied with surface coating such as electroless nickel plating. A thickness of the surface coating applied to the shaft 1 is the order of 3 to 50 μm.

In the rotor 21, a rotor yoke 5 in ring shape is securely affixed on a bottom surface of the rotor hub 2.

Further, a ring magnet 6 is securely affixed on an inner circumferential surface of the rotor yoke 5 so as to confront with the stator core 14 with maintaining a prescribed gap between the ring magnet 6 and the stator core 14. Details of each shape of the rotor hub 2, the rotor yoke 5 and the ring magnet 6, and dimensional relationship between them will be explained later.

In the motor according to the embodiment of the present invention, the shaft 1 is sustained rotatably by radial and thrust dynamic pressure bearings. With referring to FIG. 1, a dynamic pressure bearing is detailed next.

In FIG. 1, radial dynamic pressure bearings 22 and 23 are constituted by the shaft 1 and the sleeve 9.

In case of the embodiment shown in FIG. 1, an inner circumferential surface of the sleeve 9 is formed with a dynamic pressure groove such as herringbone and Rayleigh step, which is provided for generating dynamic pressure in the radial direction, as shown by herringbone patterns in FIG. 1.

Further, it should be understood that the dynamic pressure groove enables to be formed on the outer circumferential surface of the shaft 1.

A prescribed gap is provided between the outer circumferential surface of the shaft 7 and the inner circumferential surface of the sleeve 9 and filled with lubricant. By intervening of the lubricant, the dynamic pressure in the radial direction is generated in accordance with revolution of the rotor 21, that is, revolution of the shaft 1. Consequently, the rotor hub 2 in revolution is sustained in the radial direction.

On the other hand, an axial dynamic pressure bearing is constituted by a flange 7 that is fixed to a bottom end portion of the shaft 1 and a plate 10 that is affixed on a bottom end portion of the sleeve 9 so as to hermetically shield between the bottom end portion of the sleeve 9 and the flange 7.

Further, an axial dynamic pressure groove (not shown) is formed on top and bottom surfaces of the flange 7, a bottom end surface of the sleeve 8 confronting with the flange 7, and a top surface of the plate 10. The axial dynamic pressure groove is such a dynamic pressure groove as herringbone and Rayleigh step and formed by the processing method such as etching, stamping and pressing.

Furthermore, a gap is provided between the upper surface of the flange 7 and the bottom end surface of the sleeve 9 confronting with the flange 7 and between the bottom surface of the flange 7 and the top surface of the plate 10 respectively, and then lubricant is filled in these gaps. By intervening of the lubricant, the dynamic pressure in the axial direction is generated in accordance with revolution of the rotor 21, that is, revolution of the shaft 1. Consequently, the rotor hub 2 in revolution is sustained in the axial direction.

Succeedingly, details are given to the stator 3.

As mentioned above, the stator 3 is composed of the motor base 13, the stator core 14 that is fixed to the motor base 13 and the coil 15 that is wound around the stator cored 14. The motor base 13 is formed by the aluminum diecasting method, and then a prescribed portion is shaved off. The stator core 14 is applied with insulative coating through a processing method such as electro-painting and powder coating.

A terminal 15a of the coil 15 is soldered on a flexible printed circuit board (hereinafter referred to as FPC) 16 through a through hole 11 provided on the motor base 13. The FPC 16 is provided with a portion at which the terminal 15a is soldered and a land portion for connecting a driving circuit (not shown) of a hard disc drive (HDD) through a connector. These portions are electrically connected by way of a printed circuit pattern on the FPC 16.

In the above-mentioned configuration, by applying electricity to the driving circuit (not shown) of the HDD, electricity is sequentially supplied to each phase winding of the coil 15, and resulting in rotating the rotor 21.

Higher accuracy and reliability are demanded particularly for a motor to be used in a HDD for driving to rotate a disc. In accordance with increasing in recording capacity of a disc, the motor equipped with the dynamic pressure bearing according to the embodiment of the present invention is suitable for such a motor to be used in a HDD because the dynamic pressure bearing is excellent in an NRRO (Non Repeatable Run Out) characteristic in comparison with the conventional ball bearing.

With respect to the rotor yoke 5, the ring magnet 6 and the stator core 14 as an essential part, details are given to them next.

A recessed portion 28 in annular shape is provided on a bottom surface of the rotor hub 2 that is made from a non magnetic aluminum based material, wherein the recessed portion 28 is concaved upward in a circular recess. An upper end portion of the rotor yoke 5 is fit into the recessed portion 28.

The rotor yoke 5 is formed in an annular shape having a uniform thickness. A width L1 in the longitudinal direction of the rotor yoke 5 is 5 mm. The rotor yoke 5 is made from a magnetic iron based material and applied with nickel plating on the surface.

Further, a raised portion 24 in annular shape, which is protruded downward, is provided inside the recessed portion 28 that is formed on the bottom surface of the rotor hub 2. A top end portion of the ring magnet 6 is contacted with the raised portion 24, and resulting in restricting a disposition of the ring magnet 6 in the axial direction of the shaft 1. It should be understood that the raised portion 24 is not limited to a ring shape. A shape protruding intermittently in the radial direction is also acceptable for the raised portion 24. In other words, any shape is acceptable for the raised portion 24 as far as the shape enables to be stably contacted with the ring magnet 6.

The ring magnet 6 is formed in the annular shape so as to be fit inside the rotor yoke 5 without rattling. A width L2 of the ring magnet 6 in the axial direction of the shaft 1 is 4 mm. The ring magnet 6 is made from a Nd—Fe—B (neodymium-iron-boron) based material, and electro-painted on the surface.

It should be understood that the recessed portion 28 and the raised portion 24 enables to be formed by transferring a molding die through the aluminum diecasting process or by shaving process as a secondary processing.

The rotor yoke 5 is fit into the recessed portion 28 and affixed therein. On the other hand, the ring magnet 6 is affixed on the inner wall surface of the rotor yoke 5 so as to be securely fastened thereon while the ring magnet 6 is contacted with the raised portion 24. Consequently, the rotor hub 2, the rotor yoke 5 and the ring magnet 6 is assembled in one unit.

A chamfered portion 27, which is chamfered by 0.5 mm, for example, is provided at each corner of both the top and bottom end portions in the inner circumferential area of the rotor yoke 5, so that the ring magnet 6 enables to be easily inserted into or fit into the rotor yoke 5.

With respect to the above-mentioned process of assembling in one unit, each dimension of the rotor yoke 5, the ring magnet 6 and the stator core 14 is designated such that each of a center line 18 of the rotor yoke 5 having the width L1 in the longitudinal direction along the shaft 1, a center line 19 of the ring magnet 6 having the width L2 in the longitudinal direction along the shaft 1 and a center line 20 of the stator core 14 having the total thickness L3 in the longitudinal direction along the shaft 1 coincides with each other.

By this designation, the rotor yoke 5, the ring magnet 6 and the stator core 14, that is, all magnetic substances related to driving the motor are symmetrical with respect to a plane that includes the center line 18 of the rotor yoke 5 having the width L1 in the longitudinal direction along the shaft 1.

Consequently, a magnetic circuit also becomes symmetrical with respect to the plane, and resulting in reducing vibration and noise extremely while the rotor 21 is rotating.

Further, since the width L1 in the longitudinal direction of the rotor yoke 5 is longer than the width L2 of the ring magnet 6, the top and bottom end portions of the rotor yoke 5 protrude from those of the ring magnet 6 respectively in case the center line 18 of the rotor yoke 5 and the center line 19 of the ring magnet 6 is disposed so as to coincide with each other A recording and reproducing head 150 of the HDD that is installed with the motor is allocated obliquely above the ring magnet 6, so that magnetic flux possibly leaking from the ring magnet 6 is effectively shielded by the top end portion of the rotor yoke 5, which protrudes upward from the top end portion of the ring magnet 6. Consequently, the recording and reproducing head 150 is prevented from magnetic affection caused by leaked magnetic flux from the ring magnet 6.

Further, the rotor yoke 5 is formed in a ring shape without a crooked section, so that the rotor yoke 5 enables to be formed by a simple manufacturing method such as pressing a plane sheet, cutting a tubular material and rolling up a plane sheet in strips. Consequently, the rotor yoke 5 enables to be manufactured less in manufacturing processes and low in manufacturing cost. Particularly, the manufacturing method of cutting a tubular material is the most desirable method because an inner diameter of the tubular material enables to be maintained in higher accuracy, and resulting in fitting the ring magnet 6 into the rotor yoke 5 excellently.

In mass production, it possibly occurs that dimensional accuracy of each component part varies. However, in the case of the motor according to the embodiment of the present invention, a magnetic circuit enables to be defined as perfectly symmetric although the center lines 18 and 19 of the rotor yoke 5 and the stator core 14 are deviated within ±0.196 mm from the center line 20 of the ring magnet 6 on the basis of a particular case that respective center lines 18 and 19 of the rotor yoke 5 and the stator core 14 in the longitudinal direction along the shaft 1 perfectly coincide with respect to the center line 20 of the ring magnet 6, wherein the amount ±0.196 mm is equivalent to ±7% of the total width L3, that is, 2.8 mm of the stator core 14. This is caused by that the motor of the present invention is excellently low in vibration and noise within the deviation range of ±0.196 mm. Consequently, it is substantially recognized that the motor is excellently balanced.

Further, with respect to the chamfered portion 27 of the rotor yoke 5, the specific case of providing the chamfered portion 27 on the top and bottom end portions of the rotor yoke 5 is illustrated in FIG. 2. However, a chamfered shape formed on the end portion of the rotor yoke 5 hardly affects a magnetic circuit, so that symmetry of the magnetic circuit is never damaged although the chamfered portion 27 is provided only on the bottom end portion of the rotor yoke 5 confronting with the motor base 13.

Each of the motors according to the present invention and the conventional cored motors according to the prior art as a comparative example are experimentally manufactured, and vibration of the motors are measured by using a vibrormeter when they are driven by individual three rotational frequencies (rpm). Results of the measurement are shown in FIGS. 3(a) and 3(b). As shown in FIGS. 3(a) and 3(b), the motor according to the embodiment of the present invention is excellent in mean value and standard deviation in comparison with the comparative example. In other words, with respect to the motor according to the embodiment of the present invention, scattering of vibration at any rotational frequencies is superior to that of the comparative example.

It is apparent that the motor according to the present invention is superior to the conventional cored motor according to the prior art in vibration. Particularly, a maximum value of vibration that is the most important factor for evaluating a motor characteristic is drastically reduced in the motor according to the present invention.

Accordingly, the motor of the present invention is drastically improved in vibration and small in scattering of vibration during mass production.

As mentioned above, according to the present invention, there provided a cored motor, which is small in vibration and noise.

Further, the cored motor is provided with a dynamic pressure bearing, which is long in life and results in higher reliability.

Furthermore, the cored motor is easy to manufacture and low in manufacturing cost.

While the invention has been described above with reference to a specific embodiment thereof, it is apparent that many changes, modification and variations in materials and the arrangement of equipment and devices can be made without departing from the invention concept disclosed herein. For example, the embodiment is described only in a cored motor suitable for driving a disc installed in a hard disc drive (HDD). However, the cored motor according to the present invention is applied for not only an HDD but also driving an optical disc and a polygon mirror as a motor in general.

Further, the embodiment of the present invention is described in a motor in which the shaft 1 is fixed to the rotor hub 2, that is, a so-called shaft rotational type motor. However, it is also acceptable for a motor in which the shaft 1 is fixed to the motor base 13, that is, a so-called shaft fixed motor.

It should be understood that many modifications and adaptations of the invention will become apparent to those skilled in the art and it is intended to encompass such obvious modifications and changes in the scope of the claims appended hereto.

What is claimed is:

1. A cored motor comprising:
a rotor having a rotor hub, a shaft fixed to the rotor hub, a rotor yoke having a ring shape and a ring magnet fixed to an inner circumferential surface of the rotor yoke; and
a stator being composed of a motor base, and a stator core and a sleeve of cylindrical shape fixed to the motor base respectively,
wherein the shaft is inserted into the sleeve so as to support the rotor to be rotatable freely with respect to the stator while the ring magnet is kept confronting the stator core;
wherein a surface of the rotor hub in the motor base side is provided with a recessed portion of annular shape and a raised portion selectively protruding continuously or intermittently in an annular shape;
wherein the rotor yoke is fixed to the recessed portion;
wherein the ring magnet contacts the raised portion and is fixed to the rotor yoke;
wherein respective center lines of the rotor yoke, the ring magnet and the stator core in a longitudinal direction along the shaft are made approximately coincidental with each other;

wherein the rotor yoke, the ring magnet and the stator core are symmetrical with respect to a plane that intersects the shaft at right angles and includes their respective center lines;

wherein a shape of the stator core is symmetrical with respect to the plane; and further wherein a magnetic center of the ring magnet is made coincidental with the plane.

2. A cored motor comprising:

a rotor having a rotor hub, a sleeve of cylindrical shape fixed to the rotor hub, a rotor yoke having a ring shape and a ring magnet fixed to an inner circumferential surface of the rotor yoke; and a stator having a motor base, and a shaft and a stator core fixed to the motor base respectively;

wherein the shaft is inserted into the sleeve so as to support the rotor to be rotatable freely with respect to the stator while the ring magnet is kept confronting the stator core;

wherein a surface in the motor base side of the rotor hub is provided with a recessed portion having an annular shape and a raised portion selectively protruding continuously or intermittently in an annular shape;

wherein the rotor yoke is fixed to the recessed portion;

wherein the ring magnet contacts the raised portion and is fixed to the rotor yoke;

wherein respective center lines of the rotor yoke, the ring magnet and the stator core in a longitudinal direction along the shaft are made approximately coincidental with each other;

wherein the rotor yoke, the ring magnet and the stator core are symmetrical with respect to a plane that intersects the shaft at right angles and includes their respective center lines;

wherein a shape of the stator core is symmetrical with respect to the plane; and further wherein a magnetic center of the ring magnet is made coincidental with the plane.

* * * * *